United States Patent
Aytekin et al.

(10) Patent No.: US 11,062,210 B2
(45) Date of Patent: Jul. 13, 2021

(54) METHOD AND APPARATUS FOR TRAINING A NEURAL NETWORK USED FOR DENOISING

(71) Applicant: Nokia Technologies Oy, Espoo (FI)

(72) Inventors: Caglar Aytekin, Tampere (FI); Francesco Cricri, Tampere (FI); Xingyang Ni, Tampere (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 107 days.

(21) Appl. No.: 16/589,620

(22) Filed: Oct. 1, 2019

(65) Prior Publication Data

US 2020/0104711 A1 Apr. 2, 2020

Related U.S. Application Data

(60) Provisional application No. 62/740,288, filed on Oct. 2, 2018.

(51) Int. Cl.
*G06T 5/00* (2006.01)
*G06N 3/08* (2006.01)
*G06N 3/04* (2006.01)

(52) U.S. Cl.
CPC .......... *G06N 3/08* (2013.01); *G06N 3/04* (2013.01); *G06T 5/002* (2013.01); *G06T 2207/20084* (2013.01)

(58) Field of Classification Search
CPC ........ G06N 3/0454; G06N 3/088; G06N 3/04; G06N 3/08; G06T 2207/20084; G06T 5/002
See application file for complete search history.

(56) References Cited

U.S. PATENT DOCUMENTS

| 2005/0089215 A1* | 4/2005 | Staelin | H04N 19/86 382/157 |
| 2017/0347110 A1 | 11/2017 | Wang et al. | |
| 2018/0114096 A1* | 4/2018 | Sen | G06T 15/06 |

(Continued)

OTHER PUBLICATIONS

International Search Report and Written Opinion for Application No. PCT/FI2019/050701 dated Mar. 13, 2020, 17 pages.
(Continued)

*Primary Examiner* — Marcos L Torres
(74) *Attorney, Agent, or Firm* — Alston & Bird LLP

(57) ABSTRACT

A method, apparatus and computer program product provide an automated neural network training mechanism. The method, apparatus and computer program product receive a decoded noisy image and a set of input parameters for a neural network configured to optimize the decoded noisy image. A denoised image is generated based on the decoded noisy image and the set of input parameters. A denoised noisy error is computed representing an error between the denoised image and the decoded noisy image. The neural network is trained using the denoised noisy error and the set of input parameters and a ground truth noisy error value is received representing an error between the original image and the encoded image. The ground truth noisy error value is compared with the denoised noisy error to determine whether a difference between the ground truth noisy error value and the denoised noisy error is within a pre-determined threshold.

20 Claims, 5 Drawing Sheets

(56) References Cited

U.S. PATENT DOCUMENTS

2018/0184123 A1    6/2018  Terada et al.
2018/0293496 A1* 10/2018  Vogels .................. G06K 9/6298

OTHER PUBLICATIONS

Lehtinen, J. et al., *Noise2Noise: Learning Image Restoration Without Clean Data*, arXiv:1803.04189v2, Cornell University (Aug. 9, 2018) 12 pages.

Qui, G., *MLP for Adaptive Posiprocessing Block Coded Images*, IEEE Transactions on Circuits and Systems for Video Technology, vol. 10, No. 8 (Dec. 2000) 1450-1454.

Ulvanov, D. et al., *Deep Image Prior*, arXiv:1711.10925v3 (Apr. 5, 2018) 10 pages.

* cited by examiner

METHOD AND APPARATUS FOR TRAINING A NEURAL NETWORK USED FOR DENOISING

CROSS-REFERENCE TO RELATED APPLICATION

This patent application claims priority from U.S. Provisional Patent Application Ser. No. 62/740,288, titled "A METHOD AND APPARATUS FOR TRAINING A NEURAL NETWORK USED FOR DENOISING," filed Oct. 2, 2018, which is incorporated herein by reference in its entirety.

TECHNICAL FIELD

An example embodiment relates generally to training a neural network, particularly in the context of training a neural network used for denoising.

BACKGROUND

A neural network (NN) is a computation graph consisting of several layers of computation. Each layer consists of one or more units, where each unit performs an elementary computation. A unit is connected to one or more other units, and the connection may have associated a weight. The weight may be used for scaling the signal passing through the associated connection. Weights are usually learnable parameters, i.e., values which can be learned from training data. There may be other learnable parameters, such as those of batch-normalization layers.

Various media contents, such as image data, video data, or audio data may be optimized by using a neural network. For example, the concept of Deep Image Prior (DIP) utilizes neural networks to generate a visually more pleasant version of a given image, for example, by denoising the image. In addition, compression artifacts may be present in decoded or reconstructed images and neural networks (including the Deep Image Prior algorithm) may be utilized to remove such artifacts.

Such neural network related concepts, for example DIP, may utilize a training session performed at inference time. A network may be trained when the denoising is performed. The input to the neural network may be a vector of numbers, such as a sample from a noise distribution. The output is the generated or "predicted" image, which is desired to be less noisy than the given input image. The network is trained to replicate or copy the given noisy image, by computing a loss (e.g., Mean Squared Error) between the network's output and the noisy image. At each training iteration, the network outputs an predicted image. In order to select the final denoised image, a traditional approach may comprise visually inspecting all the predicted images and manually select the image that looks the best. Another traditional approach is to run the neural network for multiple iterations with weight adjusting techniques, then select the best-looking image. However, there are two main drawbacks of these traditional approaches. First, training needs to be run for a long time which results in waste of computational, memory and energy resources. Second, visual evaluation of many images is necessary which may result in further consumption of computational, memory and energy resources and may also be time consuming and requires human effort.

BRIEF SUMMARY

A method, apparatus and computer program product are provided in accordance with an example embodiment in order to provide an automated training mechanism for neural networks used for improving quality of an image.

In one example embodiment, a method is provided that includes receiving a decoded noisy image. The decoded noisy image is created by decoding an encoded image of an original image. The method further includes receiving a set of input parameters for a neural network configured to optimize the decoded noisy image. The method further includes generating, by using the neural network, a denoised image based on the decoded noisy image and the set of input parameters. The method further includes computing, a denoised noisy error representing an error between the denoised image and the decoded noisy image. The method further includes training the neural network using the denoised noisy error and the set of input parameters. The method further includes receiving, a ground truth noisy error value representing an error between the original image and the encoded image. The method further includes comparing the ground truth noisy error value with the denoised noisy error to determine whether a difference between the ground truth noisy error value and the denoised noisy error is within a pre-determined threshold. The method further includes in an instance where the difference between the ground truth noisy error value and the denoised noisy error is within the pre-determined threshold, stopping the training.

In some implementations of such a method, the method further includes outputting the denoised image as a final denoised image. In some embodiments, the method further includes in an instance where the difference between the ground truth noisy error value and the denoised noisy error is not within the pre-determined threshold, generating a second denoised image based on the decoded noisy image and the set of input parameters and computing a second denoised noisy error representing an error between the denoised image and the decoded noisy image. In some embodiments, the set of input parameters include a vector of numbers comprising a sample from a noise distribution. In some embodiments, the neural network is a deconvolutional neural network comprising a set of layers and the set of layers comprises one or more reshape layers, one or more upsampling layers, one or more convolutional layers, and one or more deconvolutional layers.

In another example embodiment, an apparatus is provided that includes at least one processor and at least one memory including computer program code for one or more programs with the at least one memory and the computer program code configured to, with the at least one processor, cause the apparatus at least to receive a decoded noisy image. The decoded noisy image is created by decoding an encoded image of an original image. The computer program code is further configured to, with the at least one processor, cause the apparatus to receive a set of input parameters for a neural network configured to optimize the decoded noisy image. The computer program code is further configured to, with the at least one processor, cause the apparatus to generate, by using the neural network, a denoised image based on the decoded noisy image and the set of input parameters. The computer program code is further configured to, with the at least one processor, cause the apparatus to compute, a denoised noisy error representing an error between the denoised image and the decoded noisy image. The computer program code is further configured to, with the at least one processor, cause the apparatus to train the neural network using the denoised noisy error and the set of input parameters. The computer program code is further configured to, with the at least one processor, cause the apparatus to receive, a ground truth noisy error value representing an error between the original image and the encoded image. The computer program code is further configured to, with the at least one processor, cause the apparatus to compare the ground truth noisy error value with the denoised noisy error to determine whether a difference between the ground truth noisy error value and the denoised noisy error is within a pre-determined threshold. The computer program code is further configured to, with the at least one processor, cause the apparatus to, in an instance where the difference between the ground truth noisy error value and the denoised noisy error is within the pre-determined threshold, stop the training.

In some implementations of such an apparatus, the computer program code is further configured to, with the at least one processor, cause the apparatus to output the denoised image as a final denoised image. In some embodiments, the computer program code is further configured to, with the at least one processor, cause the apparatus to, in an instance where the difference between the ground truth noisy error value and the denoised noisy error is not within the pre-determined threshold, generate a second denoised image based on the decoded noisy image and the set of input parameters and computing a second denoised noisy error representing an error between the denoised image and the decoded noisy image. In some embodiments, the set of input parameters include a vector of numbers comprising a sample from a noise distribution. In some embodiments, the neural network is a deconvolutional neural network comprising a set of layers and the set of layers comprises one or more reshape layers, one or more upsampling layers, one or more convolutional layers, and one or more deconvolutional layers.

In another example embodiment, a computer program product is provided that includes at least one non-transitory computer-readable storage medium having computer executable program code instructions stored therein with the computer executable program code instructions comprising program code instructions configured, upon execution, to receive a decoded noisy image. The decoded noisy image is created by decoding an encoded image of an original image. The computer executable program code instructions comprise program code instructions that are further configured, upon execution, to receive a set of input parameters for a neural network configured to optimize the decoded noisy image. The computer executable program code instructions comprise program code instructions that are further configured, upon execution, to generate, by using the neural network, a denoised image based on the decoded noisy image and the set of input parameters. The computer executable program code instructions comprise program code instructions that are further configured, upon execution, to compute, a denoised noisy error representing an error between the denoised image and the decoded noisy image. The computer executable program code instructions comprise program code instructions that are further configured, upon execution, to train the neural network using the denoised noisy error and the set of input parameters. The computer executable program code instructions comprise program code instructions that are further configured, upon execution, to receive, a ground truth noisy error value representing an error between the original image and the encoded image. The computer executable program code instructions comprise program code instructions that are further configured, upon execution, to compare the ground truth noisy error value with the denoised noisy error to determine whether a difference between the ground truth noisy error value and the denoised noisy error is within a pre-determined threshold. The computer executable program code instructions comprise program code instructions that are further configured, upon execution, to, in an instance where the difference between the ground truth noisy error value and the denoised noisy error is within the pre-determined threshold, stop the training.

In some implementations of such a computer program product, the computer executable program code instructions comprise program code instructions that are further configured, upon execution, to output the denoised image as a final denoised image. In some embodiments, the computer executable program code instructions comprise program code instructions that are further configured, upon execution, to, in an instance where the difference between the ground truth noisy error value and the denoised noisy error is not within the pre-determined threshold, generate a second denoised image based on the decoded noisy image and the set of input parameters and computing a second denoised noisy error representing an error between the denoised image and the decoded noisy image. In some embodiments, the set of input parameters include a vector of numbers comprising a sample from a noise distribution. In some embodiments, the neural network is a deconvolutional neural network comprising a set of layers and the set of layers comprises one or more reshape layer, one or more upsampling layers, one or more convolutional layers, and one or more deconvolutional layers.

In another example embodiment, an apparatus is provided that includes means for receiving a decoded noisy image. The decoded noisy image is created by decoding an encoded image of an original image. The apparatus further includes means for receiving a set of input parameters for a neural network configured to optimize the decoded noisy image. The apparatus further includes means for generating, by using the neural network, a denoised image based on the decoded noisy image and the set of input parameters. The apparatus further includes means for computing, a denoised noisy error representing an error between the denoised image and the decoded noisy image. The apparatus further includes means for training the neural network using the denoised noisy error and the set of input parameters. The apparatus further includes means for receiving, a ground truth noisy error value representing an error between the original image and the encoded image. The apparatus further includes means for comparing the ground truth noisy error value with the denoised noisy error to determine whether a difference between the ground truth noisy error value and the denoised noisy error is within a pre-determined threshold. The apparatus further includes means for in an instance where the difference between the ground truth noisy error value and the denoised noisy error is within the pre-determined threshold, stopping the training.

In some implementations of such an apparatus, the apparatus further includes means for outputting the denoised image as a final denoised image. In some embodiments, the apparatus further includes means for, in an instance where the difference between the ground truth noisy error value and the denoised noisy error is not within the pre-determined threshold, generating a second denoised image based on the decoded noisy image and the set of input parameters and computing a second denoised noisy error representing an error between the denoised image and the decoded noisy image. In some embodiments, the set of input parameters include a vector of numbers comprising a sample from a noise distribution. In some embodiments, the neural network is a deconvolutional neural network comprising a set of layers and the set of layers comprises one or more reshape layers, one or more upsampling layers, one or more convolutional layers, and one or more deconvolutional layers.

BRIEF DESCRIPTION OF THE DRAWINGS

Figure 1:
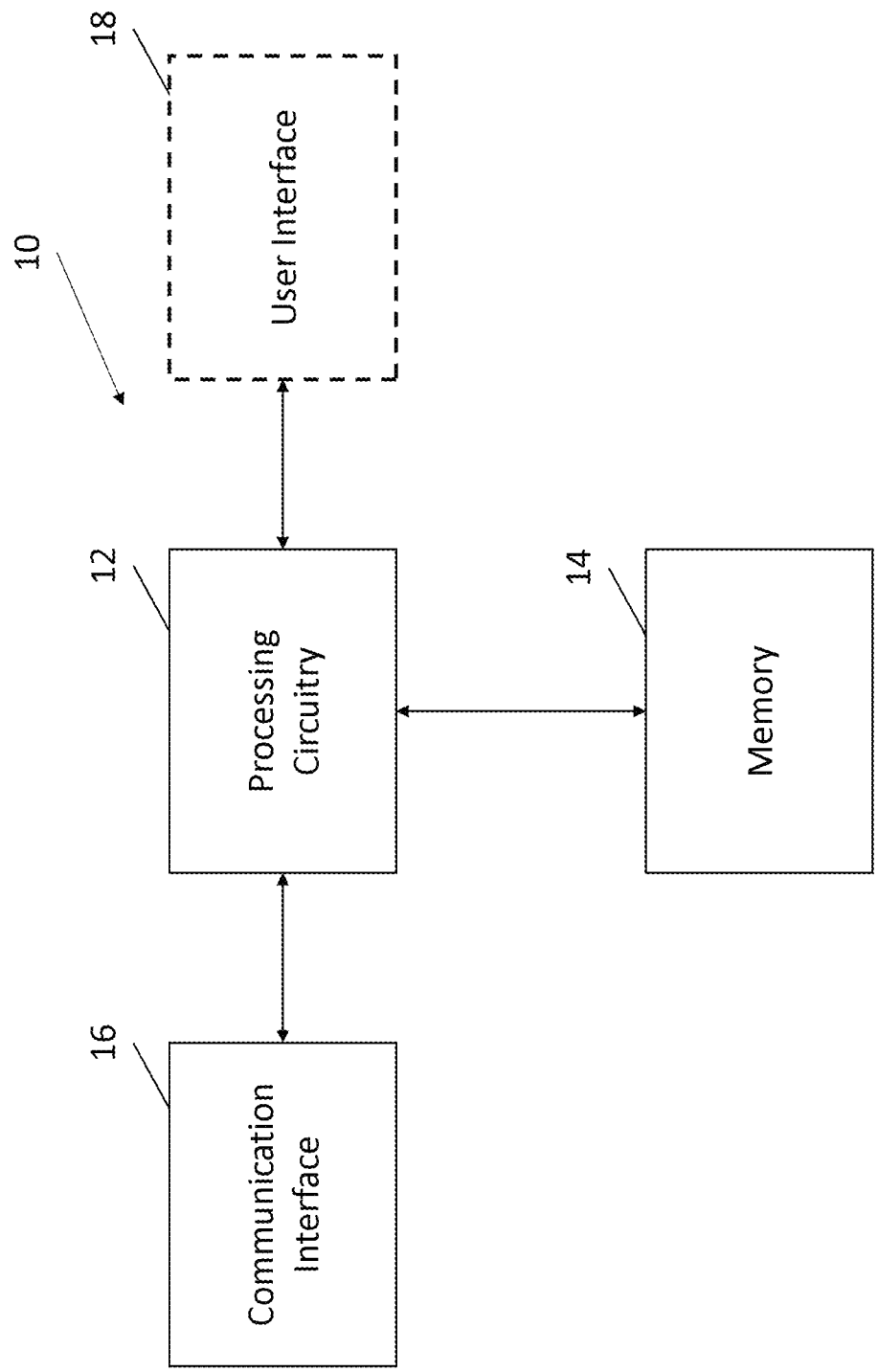
Figure 2:
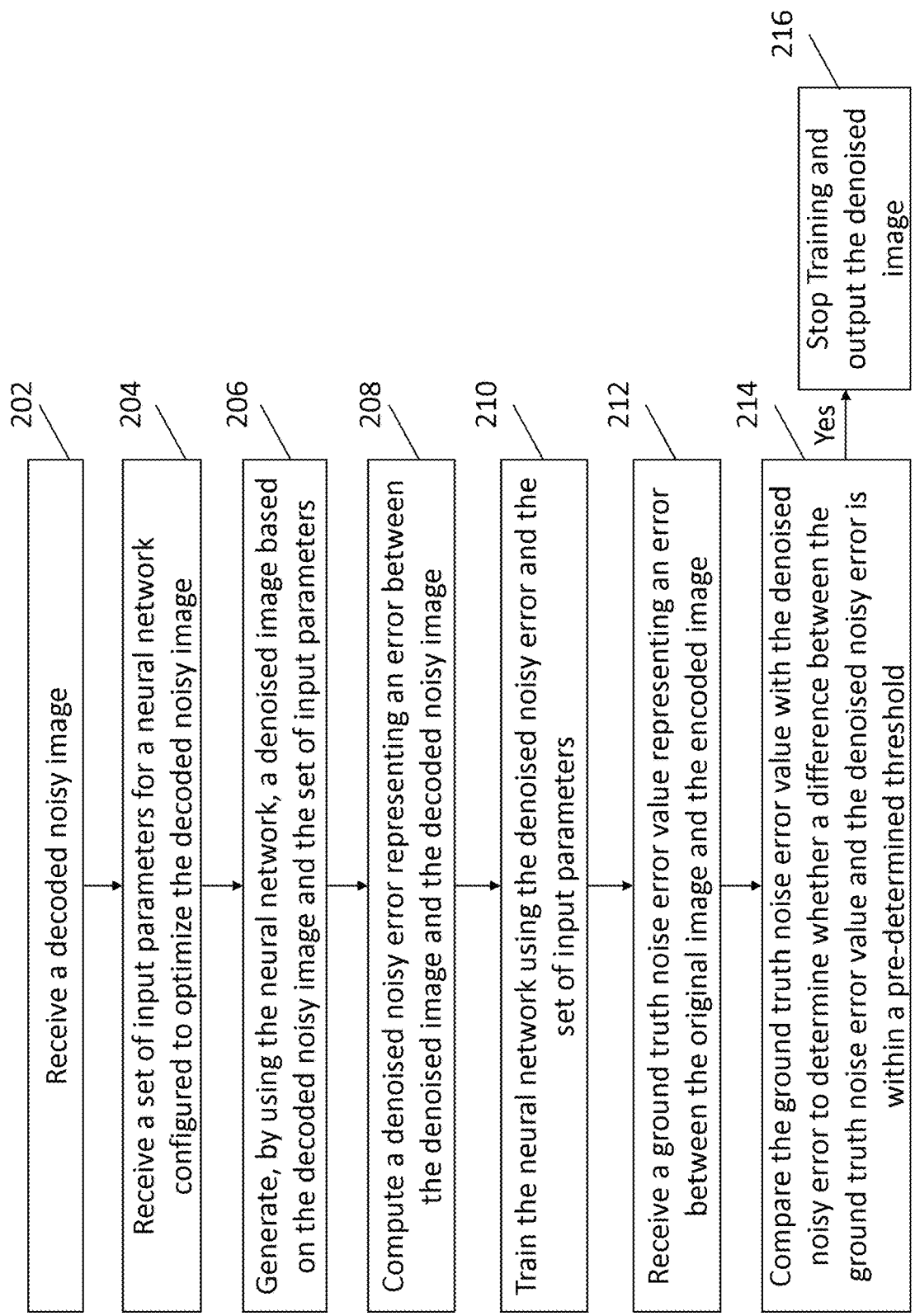
Figure 3:
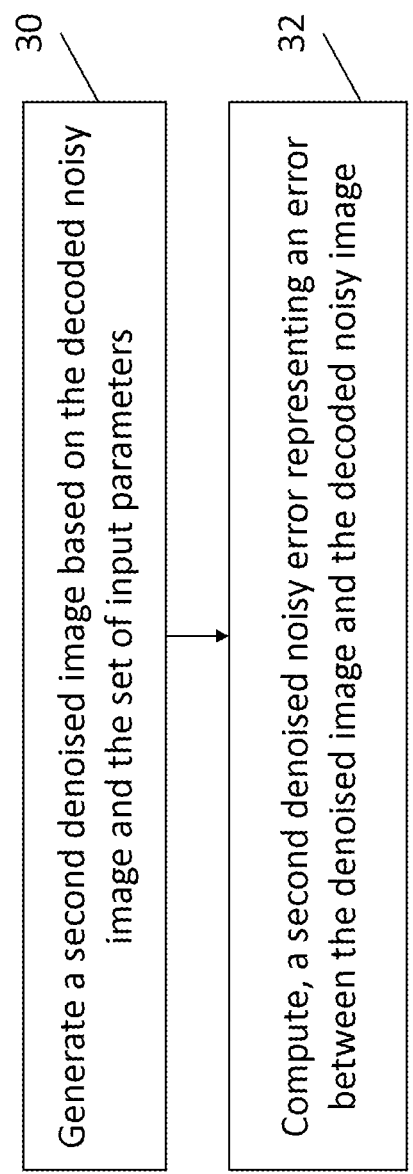
Figure 4:
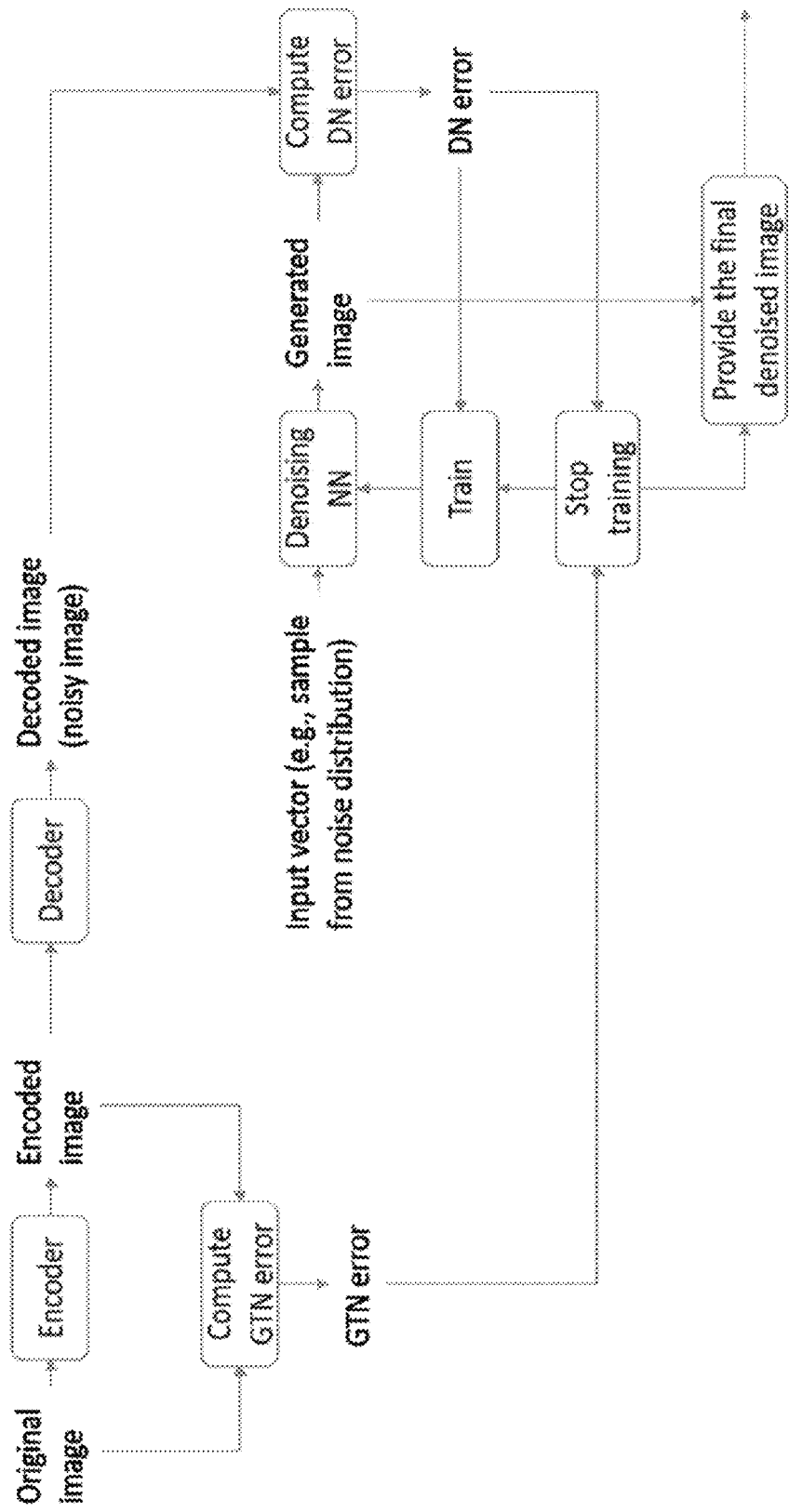
Figure 5:
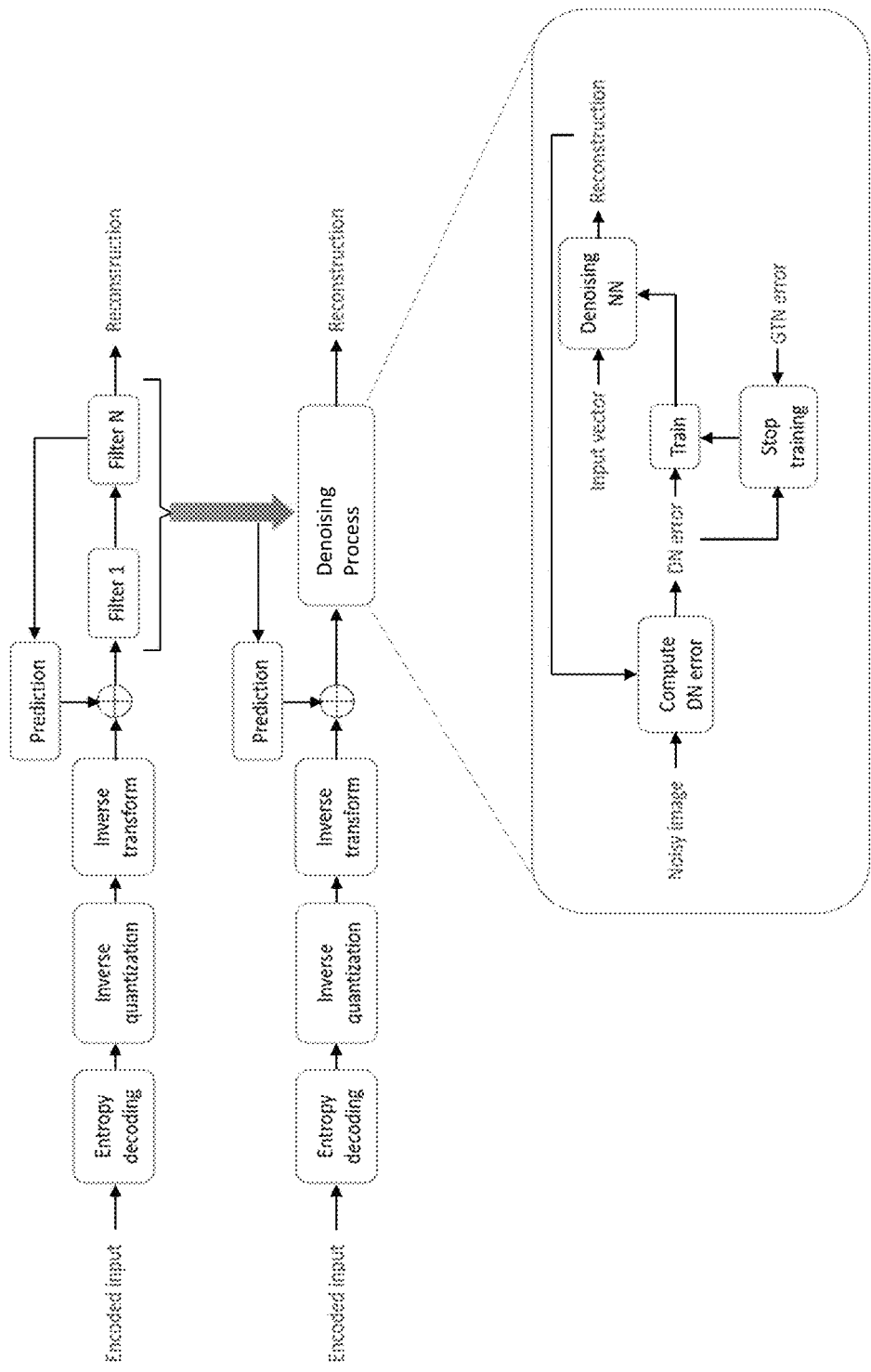

Having thus described certain example embodiments of the present disclosure in general terms, reference will hereinafter be made to the accompanying drawings, which are not necessarily drawn to scale, and wherein:

FIG. 1 is a block diagram of an apparatus that may be specifically configured in accordance with an example embodiment of the present invention;

FIG. 2 is a flowchart illustrating a set of operations performed, such as by the apparatus of FIG. 1, in accordance with an example embodiment of the present invention;

FIG. 3 is a flowchart illustrating a set of operations performed, such as by the apparatus of FIG. 1, in accordance with an example embodiment of the present invention;

FIG. 4 is a graphical representation related to FIG. 2 in accordance with an example embodiment of the present invention; and FIG. 5 is a graphical representation related to FIG. 2 in accordance with an example embodiment of the present invention.

DETAILED DESCRIPTION

Some embodiments will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (e.g., volatile or non-volatile memory device), can be differentiated from a "computer-readable transmission medium," which refers to an electromagnetic signal.

As defined herein, the term "media content" refers to image data, video data, audio data, text data, or depth data that may be encoded, decoded, and denoised.

As used herein, the terms "model", "neural network" and "neural net" are used interchangeably. Each neural network may be associated with a weight, also referred as "learnable parameters" or "parameters".

A method, apparatus and computer program product are provided in accordance with an example embodiment in order to provide an automated training mechanism for neural networks used for improving quality of an image.

A neural network (NN) is a computation graph consisting of several layers of computation. Each layer consists of one or more units, where each unit performs an elementary computation. A unit is connected to one or more other units, and the connection may have associated a weight. The weight may be used for scaling the signal passing through the associated connection. Weights are usually learnable parameters, i.e., values which can be learned from training data. There may be other learnable parameters, such as those of batch-normalization layers.

Two of the most widely used architectures for neural networks are feed-forward and recurrent architectures. Feed-forward neural networks includes no feedback loop; each layer takes input from one or more of the layers before and provides its output as the input for one or more of the subsequent layers. In addition, units inside a certain layer take input from units in one or more of preceding layers, and provide output to one or more of following layers.

Initial layers (those close to the input data) extract semantically low-level features such as edges and textures in images, while intermediate and final layers extract more high-level features. After the feature extraction layers there may be one or more layers performing a certain task, such as classification, semantic segmentation, object detection, denoising, style transfer, super-resolution, etc. In recurrent neural nets, there is a feedback loop. As a result, the network becomes stateful, i.e., it is able to memorize information or a state.

The most important property of neural nets and other machine learning tools is that they are able to learn properties from the datasets, either in a supervised way or in an unsupervised way. Such learning is a result of either a training algorithm or a meta-level neural network providing the training signal. In general, the training algorithm consists of changing some properties of the neural network so that its output is as close as possible to the desired output. For example, in the case of classification of objects in images, the output of the neural network can be used to derive a class or category index which indicates the class or category to which the object in the input image belongs. Training is usually done by minimizing or decreasing the output's error, also referred to as the loss. Examples of losses are mean squared error, cross-entropy, etc. In recent deep learning techniques, training is an iterative process, where at each iteration the algorithm modifies the weights of the neural net to make an incremental improvement of the network's output, e.g., to gradually decrease the loss.

Various media content, such as image data, video data, or audio data may be optimized by using a neural network. Neural networks are being utilized in an ever-increasing number of applications for processing various media contents for many different types of device, such as mobile phones. Examples include image and video analysis and processing, social media data analysis, device usage data analysis, etc.

Training a neural network is an optimization process. However, the final goal is different from the typical goal of optimization. In optimization, the only goal is to minimize a function. In neural network training, the goal of the optimization or training process is to make the model learn the properties of the data distribution from a limited training dataset. Therefore, the goal is to learn to use a limited training dataset so that the model generalizes to previously unseen data, e.g., data which was not used for training the model. This is usually referred to as generalization. In practice, data is usually split into at least two sets, the training set and the validation set. The training set is used for training the network, e.g., to modify its learnable parameters in order to minimize the loss. The validation set is used for checking the performance of the network on data which was not used to minimize the loss, as an indication of the final performance of the model. In particular the errors on the training set and on the validation set are monitored during the training process to gather information regarding: 1) If the network is learning at all—sometimes, the training set error may need to be decreased, otherwise the model is in the regime of underfitting; 2) If the network is learning to generalize—the validation set error may need to be decreased to be not too much higher than the training set error. If the training set error is low, but the validation set error is much higher than the training set error, or it does not decrease, or it even increases, the model is in the regime of overfitting. By overfittting, the model has just memorized the training set's properties and performs well only on that set, but performs poorly on a set not used for tuning its parameters.

Deep Image Prior (DIP) is an example concept or algorithm that utilizes neural networks to generate a visually more pleasant version of a given image, for example, by denoising the image. In addition, compression artifacts may be present in decoded or reconstructed images and neural networks may be utilized to remove such artifacts.

Some neural network related concepts, for example DIP, may utilize a training session performed at inference time. DIP consists of a training session performed at inference time, e.g., a neural network is trained when we want to perform the denoising. The input to the network may be a vector of numbers, such as a sample from a noise distribution. The output is the generated or "predicted image", which is desired to be less noisy than the given image. The network is trained to replicate or copy the given noisy image, by computing a loss (e.g., Mean Squared Error) between the network's output and the noisy image. The rationale is that convolutional and deconvolutional neural networks, thanks to the convolutions and other operations (max-pooling, which helps achieve some degree of translation-invariance) encode a local correlation prior, which is here referred to as image prior, as images have high local correlation and redundancy. Due to this image prior, learning to generate also the noise (in addition to the image content) is a very difficult task for the neural network, which can be achieved only when the network has a lot of capacity and training time to overfit to the noisy image. This is because the noise may not have local structure, or at least it has much less local structure than the actual image content.

During the training process of neural networks utilized for image denoising, a traditional approach may comprise selecting one of the predicted images output by the network during training, according to visual inspection. The image which looks better (for example, containing less noise or encoding artifacts) is manually selected. Another traditional approach is to run the neural network for multiple iterations with weight adjusting techniques, then select the best-looking image. However, there are two main drawbacks of these traditional approaches. First, training needs to be run for a long time which results in waste of computational, memory and energy resources. Second, visual evaluation of many images is necessary which may result in further consumption of computational, memory and energy resources and may also be time consuming and requires human effort.

A method, apparatus and computer program product are provided in accordance with an example embodiment in order to provide an automated training mechanism for neural networks used for improving the quality of an image. In particular, some embodiments may be utilized for denoising an image or video, or for removing other artifacts such as those from compression. Some embodiments may be applied to the DIP technique for denoising. In particular, some embodiments may provide a mechanism for stopping the training of neural networks without the need to train for long time and without the need for human intervention. Some embodiments may be applied at inference or test time, e.g., when denoising or artifacts removal needs to be performed on a given image or video.

Some embodiments comprise stopping the training when the error between the generated image and the given noisy image (referred to as the denoised noisy (DN) error) is within an interval from the error between the original image (without noise) and the noisy image (referred to as ground truth noisy (GTN) error).

In some embodiments, for the use case of denoising videos, the same ground-truth error can be used for all or some of the frames. In some embodiments, for the use case of denoising videos, the same network (for which training is stopped based on one GTN error) is used for all frames. Some embodiments may be used in a compression system including a decoder and a encoder. The encoder sends to the decoder a ground-truth error for a certain encoded image or video frame. Some embodiments may be used in a multi-camera video surveillance system for single camera video denoising.

The method, apparatus and computer program product may be utilized in conjunction with a variety of different visual and/or audiovisual content files including visual and/or audiovisual content files formatted in accordance with a number of different formats including various video, audiovisual and image file formats.

Available media file format standards include International Standards Organization (ISO) base media file format (ISO/IEC 14496-12, which may be abbreviated ISOBMFF), Moving Picture Experts Group (MPEG)-4 file format (ISO/IEC 14496-14, also known as the MP4 format), file format for NAL (Network Abstraction Layer) unit structured video (ISO/IEC 14496-15), High Efficiency Video Coding standard (HEVC or H.265/HEVC), GIF (Graphic Interchange Format), JPEG (Joint Photographic Expert Group), and High Efficiency Image File Format (HEIF).

Regardless of the file format of the visual and audiovisual content, the apparatus of an example embodiment may be provided by any of a wide variety of computing devices including, for example, a video encoder, a video decoder, a computer workstation, a server or the like, or by any of various mobile computing devices, such as a mobile terminal, e.g., a smartphone, a tablet computer, a video game player, etc. Alternatively, the apparatus may be embodied by a virtual reality system, such as a virtual reality headset capable of receiving one or more data streams and rendering visual and audiovisual content that can be presented to a user.

Regardless of the computing device that embodies the apparatus, the apparatus 10 of an example embodiment includes, is associated with or is otherwise in communication with processing circuitry 12, a memory 24, a communication interface 16 and optionally, a user interface 18 as shown in FIG. 1.

The processing circuitry 12 may be in communication with the memory device 14 via a bus for passing information among components of the apparatus 10. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processing circuitry). The memory device may be configured to store information, data, content, applications, instructions, or the like for enabling the apparatus to carry out various functions in accordance with an example embodiment of the present disclosure. For example, the memory device could be configured to buffer input data for processing by the processing circuitry. Additionally or alternatively, the memory device could be configured to store instructions for execution by the processing circuitry.

The apparatus 10 may, in some embodiments, be embodied in various computing devices as described above. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processing circuitry 12 may be embodied in a number of different ways. For example, the processing circuitry may be embodied as one or more of various hardware processing means such as a coprocessor, a microprocessor, a controller, a digital signal processor (DSP), a processing element with or without an accompanying DSP, or various other circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processing circuitry may include one or more processing cores configured to perform independently. A multi-core processing circuitry may enable multiprocessing within a single physical package. Additionally or alternatively, the processing circuitry may include one or more processors configured in tandem via the bus to enable independent execution of instructions, pipelining and/or multithreading.

In an example embodiment, the processing circuitry 12 may be configured to execute instructions stored in the memory device 14 or otherwise accessible to the processing circuitry. Alternatively or additionally, the processing circuitry may be configured to execute hard coded functionality. As such, whether configured by hardware or software methods, or by a combination thereof, the processing circuitry may represent an entity (e.g., physically embodied in circuitry) capable of performing operations according to an embodiment of the present disclosure while configured accordingly. Thus, for example, when the processing circuitry is embodied as an ASIC, FPGA or the like, the processing circuitry may be specifically configured hardware for conducting the operations described herein. Alternatively, as another example, when the processing circuitry is embodied as an executor of instructions, the instructions may specifically configure the processor to perform the algorithms and/or operations described herein when the instructions are executed. However, in some cases, the processing circuitry may be a processor of a specific device (e.g., an image or video processing system) configured to employ an embodiment of the present invention by further configuration of the processing circuitry by instructions for performing the algorithms and/or operations described herein. The processing circuitry may include, among other things, a clock, an arithmetic logic unit (ALU) and logic gates configured to support operation of the processing circuitry.

The communication interface 16 may be any means such as a device or circuitry embodied in either hardware or a combination of hardware and software that is configured to receive and/or transmit data, including media content in the form of video or image files, one or more audio tracks or the like. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

In some embodiments, such as in instances in which the apparatus 10 is configured to process the visual content in the form of video or image files and render the visual content in the form of video or image files, the apparatus 10 may optionally include a user interface 18 that may, in turn, be in communication with the processing circuitry 12 to provide output to the user, such as by rendering the media content in the form of video or image files and, in some embodiments, to receive an indication of a user input. As such, the user interface may include a display and, in some embodiments, may also include a keyboard, a mouse, a joystick, a touch screen, touch areas, soft keys, a microphone, a speaker, or other input/output mechanisms. Alternatively or additionally, the processing circuitry may comprise user interface circuitry configured to control at least some functions of one or more user interface elements such as a display and, in some embodiments, a speaker, ringer, microphone and/or the like. The processing circuitry and/or user interface circuitry comprising the processing circuitry may be configured to control one or more functions of one or more user interface elements through computer program instructions (e.g., software and/or firmware) stored on a memory accessible to the processing circuitry (e.g., memory device 14, and/or the like).

Referring now to FIG. 2, the operations performed, such as by the apparatus 10 of FIG. 2, in order to train a neural network configured to optimize an image. It should be understood that the neural network is provided as an example and a similar process could be applied to other data such as speech data, audio data, text data, depth data, video data comprising multiple images, or the like.

As shown in block 202, the apparatus includes means, such as the processing circuitry 12, the communication interface 16 or the like, for receiving a decoded noisy image. The decoded noisy image is created by decoding an encoded image of an original image. For example, as illustrated in FIG. 4, an original image is provided to an encoder to generate an encoded image of the original image. Then the encoded image is provided to a decoder to generate the decoded noisy image. The decoded noisy image comprises compression artifacts.

As shown in block 204, the apparatus includes means, such as the processing circuitry 12, the communication interface 16 or the like, for receiving a set of input parameters for a neural network configured to optimize the decoded noisy image. The set of input parameters may take the form of input vectors of numbers comprising a sample from a noise distribution. The input vectors may be floating-point values. The vectors may be samples from a noise distribution, such as a Gaussian distribution. In some embodiments, the input vectors remain constant during training of the neural network.

In some embodiments, the neural network may be randomly initialized or initialized from a pre-training stage, where the network was pre-trained to generate clean images from a given dataset. This pre-training would represent an additional induced prior into the model. The neural network may be a deconvolutional neural network comprising a set of layers. Each layer may be a reshape layer, an upsampling layer, a convolutional layer, a deconvolutional layer, an activation function (such as Rectified Linear Unit, ReLU), etc. In some embodiments, the sequence of the layers may be may be: a reshape layer to reshape from vector to matrix, and a set of blocks where each block includes an upsampling layer, a convolutional layer, a batch normalization layer, and an activation function. The encoder and decoder may be embodied on another module of the apparatus 10, or may be embodied on an apparatus in connection with the apparatus 10.

As shown in block 206, the apparatus includes means, such as the processing circuitry 12, the communication interface 16 or the like, for generating, by using the neural network, a denoised image based on the decoded noisy image and the set of input parameters.

As shown in block 208, the apparatus includes means, such as the processing circuitry 12 or the like, for computing a denoised noisy (DN) error representing an error between the denoised image and the decoded noisy image. In some embodiments, the DN error may represent actual error or distortion metric which may be any suitable distance or error for the data type of interest. In the case of images, it may be the Mean Squared Error (MSE) computed on the pixel values, the MSE computed of features extracted from the two images, or the output of another neural network configured to calculate the DN error.

As shown in block 210, the apparatus includes means, such as the processing circuitry 12, the communication interface 16 or the like, for training the neural network using the denoised noisy error and the set of input parameters. In some embodiments, the DN error may be a different error than the training error which is used for training the neural network. In some embodiments, the DN error may be the same as the training error. The training may be repeated for multiple iterations until block 216 is performed.

As shown in block 212, the apparatus includes means, such as the processing circuitry 12, the communication interface 16 or the like, for receiving a ground truth noisy (GTN) error value representing an error between the original image and the encoded and decoded image. The GTN error can be computed only by a device which has access to the original image, for example the encoder's side in the case of compression. In some embodiments, the device computing the GTN error may be another module on apparatus 10. In some embodiments, the device computing the GTN error may be a separate apparatus embodying the encoder. The GTN error may be transmitted from the encoder to the decoder either in-band (inside the encoded image's bitstream), or out-of-band.

In some embodiments, the GTN error is computed in a similar method for computing the DN error.

In some embodiments, the encoder transmits a GTN error information set including the GTN error value to the decoder. The GTN error information set may include the GTN error value and optional additional information. For example, if there are different error values for different portions of the image or frame, additional information, such as coordinates of the area to which each error value refers need to be included. In addition, the additional information can be used to associate the error value to the corresponding portion's bitstream in case the different areas/portions of an image are explicitly encoded separately in the bitstream. In some embodiments, the decoder may extract the GTN error information set and provide the GTN error information set to the apparatus 10 if the decoder is not embodied in apparatus 10.

In some embodiments where there are multiple images that form video frames provided to the apparatus 10, the encoder may send only one GTN value every M frames, which may be the GTN value computed from the first of those M frames or the average GTN values computed over all the M frames. The apparatus 10 may use only one GTN to denoise the M frames by either 1) repeating the training time for each of the M frames, every time stopping using the received GTN error; or 2) training only once by stopping using the received GTN error, and using the trained network to denoise all the M frames.

In some embodiments, the single GTN value valid for all M frames can be signalled from encoder to decoder by encoding it at the same time or before the first of the M frames is encoded. This is useful at least for a streaming scenario, so that the decoder does not need to wait for several frames in order to do the denoising. The encoder may additionally encode the number M of how many frames the current GTN value can be used on, or it may encode the indexes or timestamps of the frames the current GTN value can be used on (such as for out-of-band signalling). In some embodiments, the latest decoded GTN value can be used for several frames until a new GTN value is decoded. In some embodiments, one GTN value per frame may be computed and sent to the decoder.

As shown in block 214, the apparatus includes means, such as the processing circuitry 12, for comparing the ground truth noisy error value with the denoised noisy error to determine whether a difference between the ground truth noisy error value and the denoised noisy error is within a pre-determined threshold.

As shown in block 216, the apparatus includes means, such as the processing circuitry 12 or the like, for stopping the training and outputting the denoised image as a final denoised image if the difference between the ground truth noisy error value and the denoised noisy error is within the pre-determined threshold. If the difference between the ground truth noisy error value and the denoised noisy error is within the pre-determined threshold, the training may continue and another denoised image may be generated. As illustrated in block 30 of FIG. 3, the apparatus includes means, such as the processing circuitry 12 or the like, generating a second denoised image based on the decoded noisy image and the set of input parameters. As shown in block 32 of FIG. 3, the apparatus includes means, such as the processing circuitry 12 or the like, for computing a second denoised noisy error representing an error between the second denoised image and the decoded noisy image. Operations 210 to 214 may be similarly repeated for the second denoised image. Therefore, operations 206 to 214 may be repeated for multiple iterations until the difference between the ground truth noisy error value and the denoised noisy error is within the pre-determined threshold and operation 216 is performed.

FIG. 5 is a graphical representation of one example method of inserting the neural network and the operations in FIGS. 2 and 3 to a decoding process. As illustrated in FIG. 5, the denoising process (e.g., operations in FIGS. 2 and 3) is inserted before the reconstruction of image data.

Some embodiments may be applied to any system where it is possible to get an error between noisy data and reference data. For example, the original data may be available partially—either in space or in time, or in both space and time. For example, in distributed camera system, such as surveillance systems in modern cities, the camera systems are likely to be comprised of cameras with different characteristics, for example due to replacement (different age, different model, etc.) or different conditions (one may be affected by thermal noise or heating). However, such cameras often have overlapping field-of-views, i.e., part of the frame captured by one camera is captured also by another nearby camera. In this case, if one camera captures noisy data, the overlapping area within the noisy image may be available in clean form in the nearby camera. The GTN error may thus be computed from such overlapping area and then be used for denoising the noisy image.

For videos, data from multiple points in time, i.e., frames captured at different times, is available. If frames captured at a certain time are noisy and other frames captured at another time are not (for example, when a fixed camera captures at night time, the sensor does not receive enough light and produces noisy images compared to the daytime), a GTN error can be computed and applied for denoising the noisy frames of the video.

As described above, FIGS. 2 and 3 are flowcharts of an apparatus 10, method, and computer program product according to certain example embodiments. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory device 14 of an apparatus employing an embodiment of the present invention and executed by processing circuitry 12 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

A computer program product is therefore defined in those instances in which the computer program instructions, such as computer-readable program code portions, are stored by at least one non-transitory computer-readable storage medium with the computer program instructions, such as the computer-readable program code portions, being configured, upon execution, to perform the functions described above, such as in conjunction with the flowcharts of FIGS. 3 and 4. In other embodiments, the computer program instructions, such as the computer-readable program code portions, need not be stored or otherwise embodied by a non-transitory computer-readable storage medium, but may, instead, be embodied by a transitory medium with the computer program instructions, such as the computer-readable program code portions, still being configured, upon execution, to perform the functions described above.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, may be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims.

Although specific terms are employed herein, they are used in a generic and descriptive sense only and not for purposes of limitation.

That which is claimed:

1. A method comprising:
receiving a decoded noisy image, wherein the decoded noisy image is created by decoding an encoded image of an original image;
receiving a set of input parameters for a neural network configured to optimize the decoded noisy image;
generating, by using the neural network, a denoised image based on the decoded noisy image and the set of input parameters;
computing a denoised noisy error representing an error between the denoised image and the decoded noisy image;
training the neural network using the denoised noisy error and the set of input parameters;
receiving a ground truth noisy error value representing an error between the original image and the encoded image;
comparing the ground truth noisy error value with the denoised noisy error to determine whether a difference between the ground truth noisy error value and the denoised noisy error is within a pre-determined threshold; and
in an instance where the difference between the ground truth noisy error value and the denoised noisy error is within the pre-determined threshold, stopping the training.

2. A method according to claim 1 further comprising:
causing the denoised image to be output as a final denoised image.

3. A method according to claim 1 further comprising:
in an instance where the difference between the ground truth noisy error value and the denoised noisy error is not within a pre-determined threshold, generating a second denoised image based on the decoded noisy image and the set of input parameters; and
computing a second denoised noisy error representing an error between the denoised image and the decoded noisy image.

4. A method according to claim 1, wherein the set of input parameters includes a vector of numbers comprising a sample from a noise distribution.

5. A method according to claim 1, wherein the neural network comprises a deconvolutional neural network comprising a set of layers, and wherein the set of layers comprises one or more reshape layers, one or more upsampling layers, one or more convolutional layers, and one or more deconvolutional layers.

6. A method according to claim 1, wherein the denoised noisy error is one of a Mean Squared Error (MSE) computed on one or more pixel values or a MSE computed of features extracted from the original image and the encoded image.

7. A method according to claim 1, wherein the denoised noisy error is received from a second neural network.

8. An apparatus comprising at least one processor and at least one memory including computer program code for one or more programs, the at least one memory and the computer program code configured to, with the at least one processor, cause the apparatus at least to:
receive a decoded noisy image, wherein the decoded noisy image is created by decoding an encoded image of an original image;
receive a set of input parameters for a neural network configured to optimize the decoded noisy image;
generate, by using the neural network, a denoised image based on the decoded noisy image and the set of input parameters;
compute a denoised noisy error representing an error between the denoised image and the decoded noisy image;
train the neural network using the denoised noisy error and the set of input parameters;
receive a ground truth noisy error value representing an error between the original image and the encoded image;
compare the ground truth noisy error value with the denoised noisy error to determine whether a difference between the ground truth noisy error value and the denoised noisy error is within a pre-determined threshold; and
in an instance where the difference between the ground truth noisy error value and the denoised noisy error is within the pre-determined threshold, stop the training.

9. An apparatus according to claim 8 wherein the computer program code is further configured to, with the at least one processor, cause the apparatus at least to:
cause the denoised image to be output as a final denoised image.

10. An apparatus according to claim 8 wherein the computer program code is further configured to, with the at least one processor, cause the apparatus at least to:
in an instance where the difference between the ground truth noisy error value and the denoised noisy error is not within a pre-determined threshold, generate a second denoised image based on the decoded noisy image and the set of input parameters; and
compute a second denoised noisy error representing an error between the denoised image and the decoded noisy image.

11. An apparatus according to claim 8, wherein the set of input parameters includes a vector of numbers comprising a sample from a noise distribution.

12. An apparatus according to claim 8, wherein the neural network comprises a deconvolutional neural network comprising a set of layers, and wherein the set of layers comprises one or more reshape layers, one or more upsampling layers, one or more convolutional layers, and one or more deconvolutional layers.

13. An apparatus according to claim 8, wherein the denoised noisy error is one of a Mean Squared Error (MSE) computed on one or more pixel values or a MSE computed of features extracted from the original image and the encoded image.

14. An apparatus according to claim 8, wherein the denoised noisy error is received from a second neural network.

15. A computer program product comprises at least one non-transitory computer-readable storage medium having computer executable program code instructions stored therein, the computer executable program code instructions comprising program code instructions configured, upon execution, to:
receive a decoded noisy image, wherein the decoded noisy image is created by decoding an encoded image of an original image;
receive a set of input parameters for a neural network configured to optimize the decoded noisy image;
generate, by using the neural network, a denoised image based on the decoded noisy image and the set of input parameters;

compute a denoised noisy error representing an error between the denoised image and the decoded noisy image;

train the neural network using the denoised noisy error and the set of input parameters;

receive a ground truth noisy error value representing an error between the original image and the encoded image;

compare the ground truth noisy error value with the denoised noisy error to determine whether a difference between the ground truth noisy error value and the denoised noisy error is within a pre-determined threshold; and in an instance where the difference between the ground truth noisy error value and the denoised noisy error is within the pre-determined threshold, stop the training.

16. A computer program product according to claim 15 wherein the computer executable program code instructions further comprise program code instructions configured, upon execution, to:

cause the denoised image to be output as a final denoised image.

17. A computer program product according to claim 15 wherein the computer executable program code instructions further comprise program code instructions configured, upon execution, to:

in an instance where the difference between the ground truth noisy error value and the denoised noisy error is not within a pre-determined threshold, generate a second denoised image based on the decoded noisy image and the set of input parameters; and compute, a second denoised noisy error representing an error between the denoised image and the decoded noisy image.

18. A computer program product according to claim 15, wherein the set of input parameters includes a vector of numbers comprising a sample from a noise distribution.

19. A computer program product according to claim 15, wherein the neural network comprises a deconvolutional neural network comprising a set of layers, wherein the set of layers comprises one or more reshape layers, one or more upsampling layers, one or more convolutional layers, and one or more deconvolutional layers.

20. A computer program product according to claim 15, wherein the denoised noisy error is one of a Mean Squared Error (MSE) computed on one or more pixel values or a MSE computed of features extracted from the original image and the encoded image.

* * * * *